United States Patent [19]
Patterson

[11] Patent Number: 5,616,219
[45] Date of Patent: *Apr. 1, 1997

[54] SYSTEM AND METHOD FOR ELECTROLYSIS AND HEATING OF WATER

[76] Inventor: James A. Patterson, 2074 20th St., Sarasota, Fla. 34234

[*] Notice: The term of this patent shall not extend beyond the expiration date of Pat. No. 5,494,559.

[21] Appl. No.: 489,894

[22] Filed: Jun. 13, 1995

[51] Int. Cl.$^6$ .................................................. C25B 9/00
[52] U.S. Cl. .......................................................... 204/241
[58] Field of Search ................................. 204/242, 249, 204/1.11, 239, 241

[56] References Cited

U.S. PATENT DOCUMENTS

| | | | |
|---|---|---|---|
| 3,632,496 | 1/1972 | Patterson | 204/249 |
| 3,888,756 | 6/1975 | Teshima et al. | 204/275 |
| 4,152,238 | 5/1979 | Okazaki | 204/228 |
| 4,269,689 | 5/1981 | Agladze | 204/268 |
| 4,316,786 | 2/1982 | Yu et al. | 204/223 |
| 4,913,779 | 4/1990 | Lacoste | 204/1.11 |
| 4,943,355 | 7/1990 | Patterson | 205/151 |
| 5,036,031 | 7/1991 | Patterson | 502/10 |
| 5,273,635 | 12/1993 | Gernert | 204/241 |
| 5,318,675 | 6/1994 | Patterson | 204/86 |
| 5,372,688 | 12/1994 | Patterson | 204/222 |
| 5,494,559 | 2/1996 | Patterson | 204/222 |

OTHER PUBLICATIONS

*Ex Parte Dash*, 27 U.S.P.Q.2d 1481 (B.P.A.I. 1992) No Month Available.
T.R. Guilinger, et al. "Investigation of Fusion Reactions in Palladium and Titanium Tritide . . ." No Date Available.
J.W. Fleming, et al. "Calorimetric Studies of Electrochemical Incorporation of Hydrogen Isotopes Into Palladium" J. Fusion Energy V.9 No.4 (1990) No Month Available.
Edmund C. Potter, *Electrochemistry, Principles and Applications*, Cleaver–Hume Press, London (1959).

*Primary Examiner*—Kathryn Gorgos
*Assistant Examiner*—Brendan Mee
*Attorney, Agent, or Firm*—Charles J. Prescott

[57] ABSTRACT

A system and method for electrolysizing and/or heating a liquid electrolyte containing water having a conductive salt in solution and for producing excess heat within the water for use. An electrolytic cell includes a non-conductive housing having an inlet and an outlet and spaced apart first and second conductive foraminous grids connected within the housing. A plurality of microspheres each having improved conductive exterior multi-layers of uniform thickness are positioned within the housing in electrical contact with the first grid adjacent the inlet. The conductive microspheres are plated first with a metal cation which will reduce with hydrazine to form a conductive metal flash coating. The microspheres are then plated with a uniform layer of nickel, followed by plated layer of metallic hydride which is readily combinable with hydrogen or an isotope of hydrogen, then a uniform metallic support plating having a high hydrogen diffusion rate and a low hydride formation ratio. An electric power source in the system is operably connected across the first and second grids whereby electrical current flows between the grids within the liquid electrolyte. Heat is added to the water to elevate system electrolyte operating temperature for increased yields of heat for use.

22 Claims, 3 Drawing Sheets

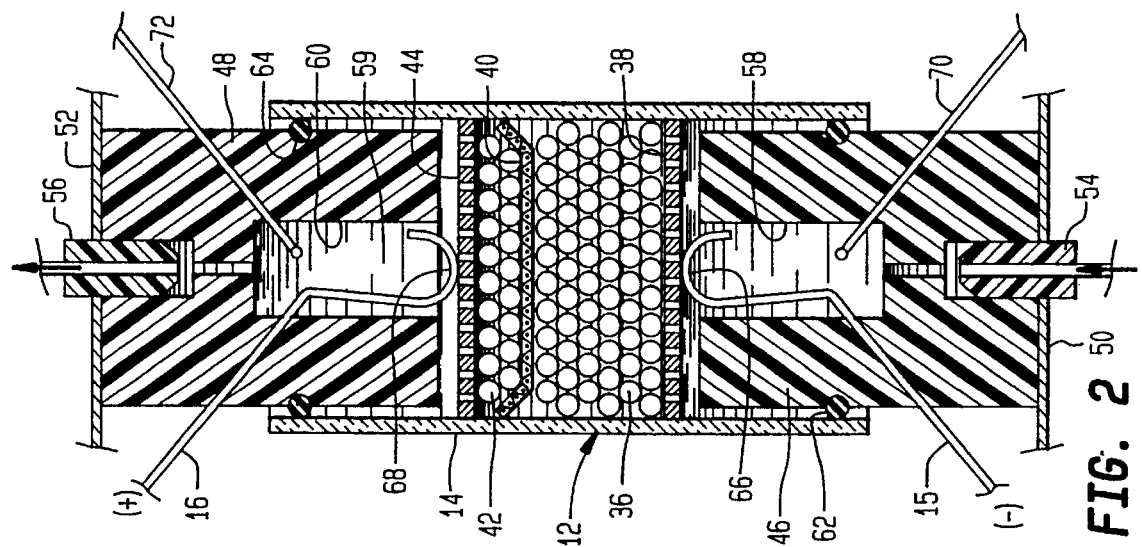
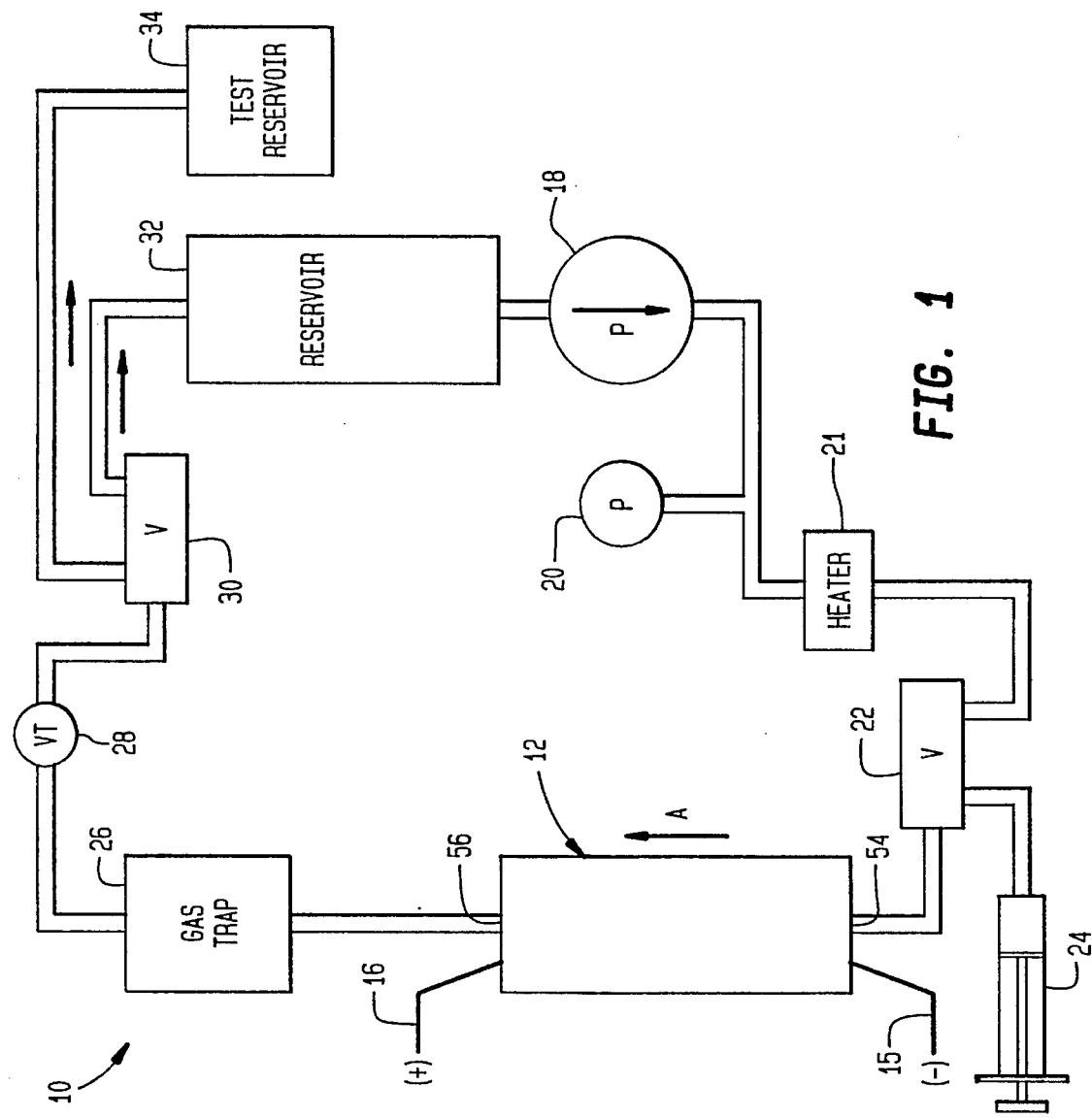

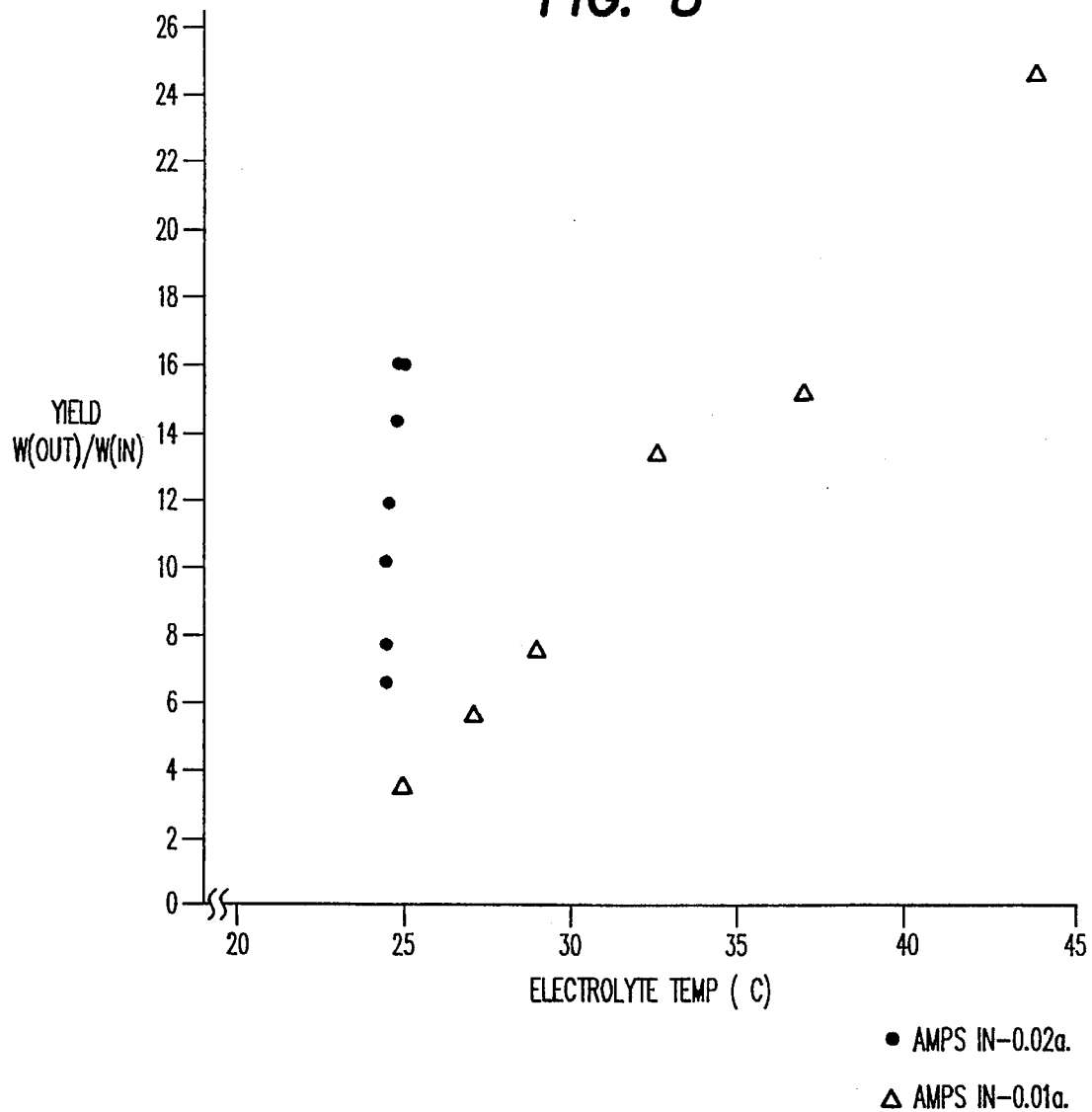

5,616,219

SYSTEM AND METHOD FOR ELECTROLYSIS AND HEATING OF WATER

BACKGROUND OF THE INVENTION

1. Scope of Invention

This invention generally relates to electrolytic cells, and more particularly to an improved electrolytic cell for electrolysis of water and the production of excess heat.

2. Prior Art

The present invention utilizes and improves upon microspheres formed of non-metallic beads which are plated with a uniformly thick coating of palladium. These palladium coated microspheres are taught in my previous U.S. Pat. Nos. 4,943,355 and 5,036,031. In these above-recited previous patents, cross linked polymer microspheres having a plating of palladium are taught to exhibit improvements in the absorption of hydrogen and isotopes of hydrogen. Utilizing these catalytic microspheres led to my later U.S. Pat. Nos. 5,318,675 ('675) and 5,372,688 ('688) (incorporated herein by reference) which teach an electrolytic cell, system and method for, inter alia, producing heat.

The use of a palladium sheet to form one electrode within an electrolytic cell to produce excess heat, the electrolytic cell being a Pons-Fleischmann-type is taught by Edmund Storms. The description of the Storms electrolytic cell and his experimental performance results are described in an article entitled *Measurements of Excess Heat from a Pons-Fleischmann-Type Electrolytic Cell Using Palladium Sheet* appearing in Fusion Technology, Volume 3, Mar. 1993. In a previous article, Storms reviewed experimental observations about electrolytic cells for producing heat in an article entitled "Review of Experimental Observations About the Cold Fusion Effect" FUSION TECHNOLOGY, Vol. 20, Dec. 1991.

None of the previously reposed experimental results or other prior art devices known to applicant other than my U.S. '675 and '688 patents have utilized or disclosed non-conductive copolymeric beads of palladium coated (or any substitute metal which will form "metallic hydrides" in the presence of hydrogen) conductive microspheres within an electrolytic cell for the production of hem and the electrolysis of water into its hydrogen and oxygen components. Neither does prior art teach the addition of heat to a liquid electrolyte flowing through an electrolytic cell of a closed, circulating system for producing heat. The present invention discloses various improved embodiments of preferably palladium/nickel coated microspheres within an electrolytic cell in conjunction with an electrolytic media containing either water or heavy water, particularly deuterium.

BRIEF SUMMARY OF THE INVENTION

This invention is directed to an improved system and method for electrolysizing water containing a conductive salt in solution and for producing excess heat within the water for use. An electrolytic cell of the system includes a non-conductive housing having an inlet and an outlet and spaced apart first and second conductive foraminous grids positioned within the housing. A plurality of preferably spherical beads each having a conductive uniform preferably palladium plating over a nickel plating and an outer preferably nickel plating thereon are positioned within the housing in electrical contact with the first grid adjacent the inlet. An electric power source is operably connected across the first and second grids whereby electrical current flows between the grids within the water solution. Heat is added externally to the electrolytic cell to the water-based electrolyte to produce higher yields of useful heat output.

It is therefore an object of this invention to utilize preferably palladium coated microspheres as previously disclosed in my '675 and '688 patents and other multi-layer arrangements in an improved system and method for the production of either hydrogen and oxygen and/or heat for use.

It is yet another object of this invention to provide an improved system and method having an improved electrolytic cell for the increased production of heat in the form of heated water or heavy water-based electrolyte exiting the cell.

It is yet another object of this invention to utilize metal coated conductive microspheres in an electrolytic cell of an improved system and method for producing heat in a flowing liquid electrolyte, the metal chosen from those which exhibit strong hydrogen absorption properties to form "metallic hydrides" and structurally supported by one or more adjacent uniform plated support layers.

It is another object of this invention to provide an electrolytic cell in an improved system for electrolysizing water and/or producing increasing quantities of heat transferred to the liquid electrolyte as it flows in steady state through the system and cell.

In accordance with these and other objects which will become apparent hereinafter, the instant invention will now be described with reference to the accompanying drawings.

BRIEF DESCRIPTION OF THE DRAWINGS

FIG. 1 is a schematic view of an experimental system embodying the present invention.

FIG. 2 is a section view of the electrolytic cell shown in FIG. 1.

FIG. 8 is a graphic representation of the test results of Tables I and II of the Detailed Description.

DETAILED DESCRIPTION OF THE INVENTION

Figure 3:
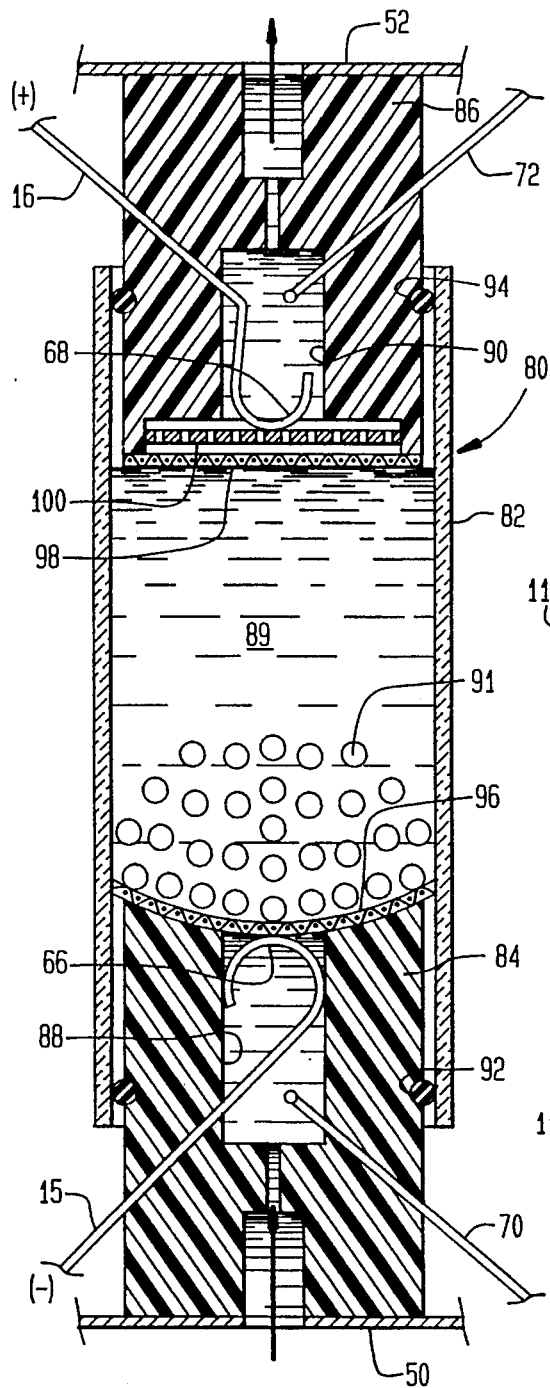
FIG. 3 is a section view of another embodiment of the electrolytic cell during flow of an electrolyte therethrough.

My prior U.S. Pat. Nos. 5,318,675 (U.S. '675) and 5,372,688 (U.S. '688) and the teachings contained therein are hereby incorporated by reference.

Referring now to the drawings, and particularly to FIGS. 1 and 2, a system embodying concepts of the invention utilized during testing procedures is shown generally at numeral 10. This system 10 includes an electrolytic cell shown generally at numeral 12 interconnected at each end with a closed loop electrolyte circulation system. The circulation system includes a pump 18 which draws a liquid electrolyte 59 from a reservoir 32 and forces the electrolyte 59 in the direction of the arrow into inlet 54 of electrolytic cell 12. This pump 18 is a constant volume pump. After the electrolytic cell 12 is completely filled with the electrolyte 59, the fluid then exits an outlet 56, then flowing into a gas trap 26 which is provided to separate hydrogen and oxygen gas from the electrolyte 59 when required. A throttle valve 28 downstream of the gas trap 26 regulate the electrolyte flow so as to also regulate the fluid pressure within the electrolytic cell 12 as monitored by pressure gauge 20.

A slide valve 22 provides for the intermittent introduction of ingredients into the liquid electrolyte 59 via syringe 24. A second slide valve 30 provides for the periodic removal of electrolyte 59 into test reservoir 34 for analysis to determine correct electrolyte make-up.

Also shown in FIG. 2 is an in-line heater 21 disposed between the pressure gauge 20 and the slide valve 22. This heater 21 is provided to heat the electrolyte liquid as it flows through the system 10 and externally the cell 12. Note importantly that the heater 21 may be positioned anywhere in the closed system electrolyte flow path as the heating applied is of a steady state nature rather than only a pre-heating condition of the electrolyte, although positioning of the heater 21 is preferred to be adjacent the inlet 54 of the cell 12 for better liquid electrolyte temperature control.

In FIG. 2, the details of the electrolytic cell 12 utilized during testing procedures is there shown. A cylindrical glass non-conductive housing 14, open at each end, includes a moveable non-conductive end member 46 and 48 at each end thereof. These end members 46 and 48 are sealed within the housing 14 by O-rings 62 and 64. The relative spacing between these end members 46 and 48 is controlled by the movement of end plates 50 and 52 there against.

Each of the end members 46 and 48 includes an inlet stopper 54 and an outlet stopper 56, respectively. Each of these stoppers 54 and 56 define an inlet and an outlet passage, respectively into and out of the interior volume, respectively, of the electrolytic cell 12. These end members 46 and 48 also include a fluid chamber 58 and 60, respectively within which are mounted electrodes 15 and 16, respectively, which extend from these chambers 58 and 60 to the exterior of the electrolytic cell 12 for interconnection to a d.c. power supply (not shown) having its negative and positive terminals connected as shown. This d.c. power supply is a constant current type.

Also positioned within the chambers 58 and 60 are thermocouples 70 and 72 for monitoring the electrolyte temperature at these points of inlet and outlet of the electrolytic cell 12.

A plurality of conductive microspheres 16 are positioned within housing 14 immediately adjacent and against a conductive foraminous grid 38 formed of platinum and positioned transversely across the housing 14 as shown. These conductive microspheres 36 are formed of non-conductive inner polymer beads and include a uniform palladium plating layer. The preferred size of these conductive microspheres are in the range of 1.0 mm or less in diameter and the details of the manufacture of these conductive microspheres 36 are generally taught in my previous U.S. Pat. Nos. 4,943,355 and 5,036,031. My co-pending U.S. application Ser. No. 08/462,005, filed on Jun. 5, 1995, entitled "Improved Uniformly Plated Microsphere Catalyst", incorporated herein by reference, discloses the broad details of this improved conductive microsphere. These improved conductive microspheres 36 preferably include an inner nickel plate atop a metallic flash coat, a preferably palladium plate atop the inner nickel plate, and a support plate atop the palladium, preferably nickel.

In the previously reported testing in U.S. '675 and '688, an intermediate layer of nickel was alternately added over a copper flash coat beneath the palladium plate. The nickel intermediate layer, producing a mean microsphere density of 1.51 g/cm$^3$, was positioned immediately beneath the palladium plated layer to increase the density of the conductive microspheres 36. In this testing, a black residue developed within the liquid electrolyte which was subsequently analyzed and determined to be palladium. Further investigation showed that the outer palladium coat of these previous original microspheres, being subjected to both a heat and electrical current duty cycle, either flaked, spalied and/or incurred minor cracking of the palladium plate. This inservice deterioration both shortened the useful life of the previously described cell and its efficiency in producing heat.

Still referring to FIG. 2, a non-conducive foraminous nylon mesh 40 is positioned against the other end of these conductive microspheres 36 so as to retain them in the position shown. Adjacent the opposite surface of this non-conductive mesh 40 is a plurality of non-conductive spherical microbeads 42 formed of cross-linked polystyrene and having a uniform diameter of about 1.0 mm. Against the other surface of this layer of non-conductive microspheres 42 is a conductive foraminous grid 44 positioned transversely across the housing 14 as shown.

Should the system 10 boil off or otherwise inadvertently lose all liquid electrolyte within the cell 12, a means of preventing system shut-down is preferred which replaces the non-conductive microspheres 42 with non-metallic spherical cation ion exchange polymer conductive microbeads preferably made of cross-linked styrene divinyl benzene which have fully sulfonated surfaces which have been ion exchanged with a lithium salt. This preferred non-metallic conductive microbead structure will thus form a salt bridge between the anode 44 and the conductive microspheres 36, the non-conductive mesh 40 having apertures sufficiently large to permit contact between the conductive microspheres 36 and the conductive non-metallic microbeads. The mesh size of mesh 40 is 200–500 micrometers. This preferred embodiment also prevents melting of the replaced non-conductive microbeads 42 while reducing cell resistance during high loading and normal operation.

The end of the electrode 15 is in electrical contact at 66 with conductive grid 38, while electrode 16 is in electrical contact at 68 with conductive grid 44 as shown. By this arrangement, when there is no electrolyte within the electrolytic cell 12, no current will flow between the electrodes 15 and 16.

ELECTROLYTE

When the electrolytic cell 12 is filled with a liquid electrolyte 59, current will flow between the electrodes 15 and 16. The preferred formulation for this electrolyte 59 is generally that of a conductive salt in solution with water. The preferred embodiment of water is that of either light water ($H_2^1O$) or heavy water and more specifically that of deuterium ($H_2^2O$). The purity of all of the electrolyte components is of utmost importance. The water ($H_2^1O$) and the deuterium ($H_2^2O$) must have a minimum resistance of one megohm with a turbidity of less than 0.2 n.t.u. This turbidity is controlled by ultra membrane filtration. The preferred salt solution is lithium sulfate ($Li_2SO_4$) in a 2-molar mixture with water and is of chemically pure quality. In general, although a lithium sulfate is preferred, other conductive salts chosen from the group containing boron, aluminum, gallium, and thallium, as well as lithium, may be utilized. The preferred pH or acidity of the electrolyte is 9.0.

CONDUCTIVE BEADS

Palladium coated microspheres were originally preferred as disclosed in U.S. Pat. Nos. '675 and '688. However, palladium may be substituted by other transition metals, rare earths and also uranium. In general, any of these metals which are capable of combining with high volumes of hydrogen to form "metallic hydrides" are acceptable. These metals known to applicant which will serve as a substitute for palladium are lanthanum, praseodymium, cerium, titanium, zirconium, vanadium, tantalum, uranium, hafnium and thorium. Authority for the inclusion of these elements within this group is found in a book entitled "*Inorganic Hydrides,* by B. L. Shaw, published by Pergammon Press, 1967. However, palladium is the best known and most widely studied metallic hydride and was utilized in my previously referenced patents to form conductive hydrogen-absorbing microspheres. In an even more general sense, the broad requirement here is to provide a "metallic hydride" surface, the makeup of the core of the microspheres being a secondary consideration.

ALTERNATE EMBODIMENTS

Figure 4:
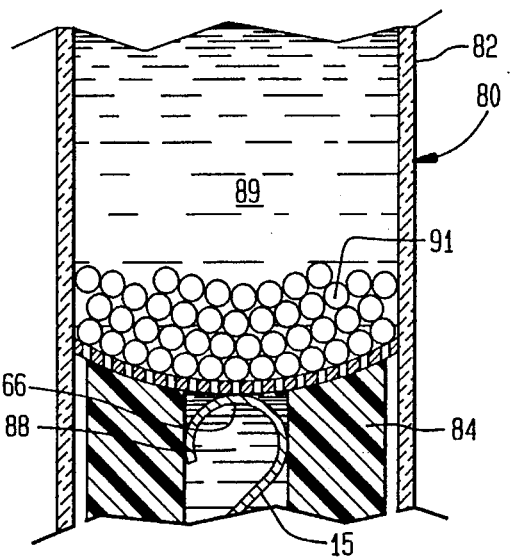
FIG. 4 is a partial section view of FIG. 3 with the electrolytic cell at rest.

Referring now to FIGS. 3 and 4, an alternate embodiment of the electrolytic cell 80 is there shown. In this embodiment 80, a non-conductive glass cylindrical housing 82 is again utilized with non-metallic delrin end members 84 and 86 sealably engaged by O-rings 92 and 94 within the ends of housing 82. Inlet and outlet chambers 88 and 90, respectively are formed into the end members 84 and 86, respectively, end member 84 defining an inlet end, while end member 86 defines an outlet end of the electrolytic cell 80.

A plurality of conductive microspheres 91 formed of a palladium coating over non-metallic beads having a first conductive copper layer and an intermediate nickel layer as previously described are disposed against a concave foraminous conductive grid 96 formed of platinum which is, in turn, disposed against the inner end of end member 84 as shown. An electrode 16 is in electrical contact with the conductive grid 96 within inlet chamber 88 as shown. A thermocouple 70 monitors the temperature of the electrolyte 89 flowing into inlet chamber 88. These conductive microspheres 91 are loosely packed whereby, when the electrolyte 89 flows in the direction of the arrows through the electrolytic cell 80 as shown in FIG. 3, they raise above the upright housing 82 so as to be spaced upwardly toward a non-conductive foraminous nylon mesh 98 positioned adjacent the inner end of end member 86. Thus, by controlling the flow rate of the electrolyte 89, the spread or spacing between the conductive microspheres 91 and the degree of movement or agitation is regulated. Although the loose microspheres 91 roll and mix about, electrical contact is maintained therebetween.

A second conductive foraminous platinum grid 100 is positioned between the non-conductive mesh 98 and end member 86 in electrical contact with another electrode 15 at 68. A thermocouple 72 monitors the temperature of the electrolyte 89 as it flows out of the electrolytic cell 80.

As previously described, the end members 84 and 86 are movable toward one another within housing 82 by pressure exerted against plates 50 and 52. This end member movement serves to regulate the volume of the electrolyte 89 within the electrolytic cell 80.

The conductive beads 91 shown in FIG. 4 are shown in their at-rest position during which very little, if any, electrolyte flow is occurring through the electrolytic cell 82.

Figure 5:
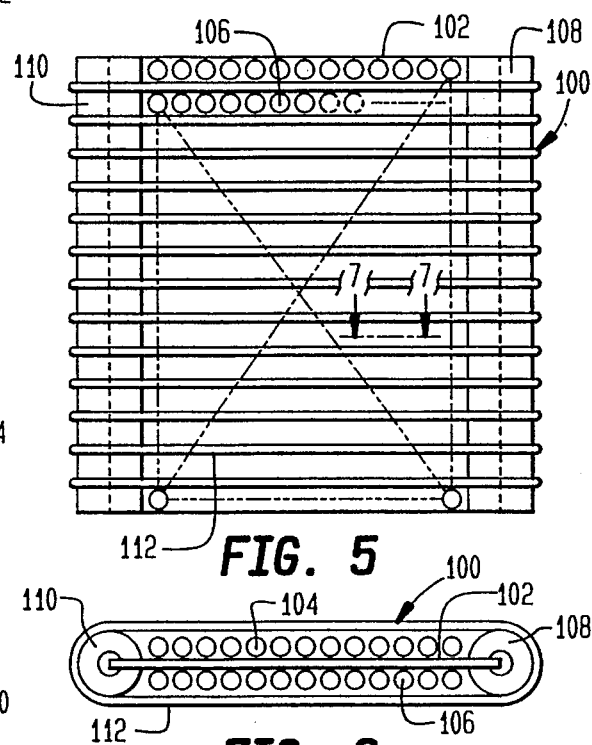
FIG. 5 is yet another embodiment of the combined anode and cathode of an electrolytic cell of the present invention.
Figure 6:
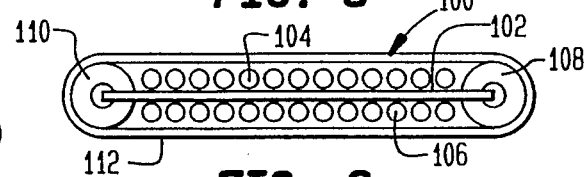
FIG. 6 is an end view of FIG. 5.
Figure 7:
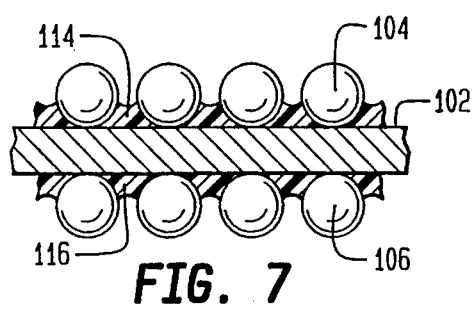
FIG. 7 is an enlarged section view in the direction of arrows 7—7 in FIG. 5.

Referring now to FIGS. 5, 6 and 7, another embodiment of the conductive grids is there shown. A conductive plate 102 formed of silver plated metal having the conductive microspheres 104 and 106 epoxy (non-conductive) bonded at 114 and 116 to the conductive plate 102 is utilized to define the cathode of the electrolytic cell. Thus, the only exposed conductive surface in the cathode is that of the conductive microspheres 104. Non-conductive split polyethylene tubes 108 and 110 extend along the opposing edges of conductive plate 102, around which are wound a plurality of conductive wire bands 112 formed of platinum plated silver wire 0.1 cm in diameter. By this arrangement, the electrolyte may flow along the length of the conductive plate 102 and conductive microspheres 104 to form the necessary electrolytic current flow path between the conductive plate 102 (cathode) and the conductive wire bands 112 (anode), all of the conductive bands 112 being in electrical contact with the positive (+) side of the d.c. power supply (not shown), while the conductive plate 102 being in electrical communication with the negative (−) terminal of that power supply.

EXPERIMENTAL RESULTS/VERIFICATION

Experimental test procedures and results and graphic display of those results from my previous U.S. Pat. Nos. '675 and '688 are repeated by reference thereto. Similar tests with respect to the new multi-layer conductive microspheres were conducted which showed substantially above 100% heat outputs (yields), also referred to as "excess heat". Excess heat is more generally defined herein as the ratio (greater than 1.0) of heat energy output to electrical power input.

Table I herebelow represents a tabularization of test results performed on an electrolytic cell similar to that shown in FIG. 2 using the above-described nickel/palladium/nickel coated microspheres at 36 of FIG. 2. Table I thus presents the data taken in terms of elapsed time (in hours), the change in temperature of the electrolyte between the inlet 54 and outlet 56, of the cell 12 ($\Delta T$ ° C.), current (in amps), and volts across the electrolytic cell 12 between terminals 15 and 16, the flow rate of electrolyte (m/L), and watt input, watt output and % yield. Percent yield is defined of the wattage output divided by the wattage input×100.

TABLE I

| Time (hrs) | $\Delta T$ °C. (ToTin) | T (in) °C. | Amps | Volts | Flow Rate m/L | Watt in | Watt out | % Yield |
|---|---|---|---|---|---|---|---|---|
| Low Current | | | | | | | | |
| 0 | 0 | 24.5 | 0.02 | 2.93 | 13.6 | — | — | — |
| 0.5 | 0.2 | 24.5 | 0.02 | 3.05 | 14.0 | 0.029 | 0.19 | 657 |
| 1.0 | 0.3 | 24.7 | 0.02 | 3.05 | 15.0 | .031 | 0.31 | 1016 |
| 1.5 | 0.35 | 24.7 | 0.02 | 3.07 | 15.0 | .031 | 0.37 | 1185 |
| 2.0 | 0.2 | 24.7 | 0.02 | 2.90 | 15.4 | 0.028 | 0.22 | 770 |
| 2.5 | 0.4 | 25.0 | 0.02 | 2.85 | 15.4 | 0.027 | 0.43 | 1597 |
| 3.0 | 0.4 | 24.7 | 0.02 | 2.85 | 15.4 | 0.027 | 0.43 | 1597 |
| 3.5 | 0.4 | 24.7 | 0.02 | 32.85 | 15.4 | 0.027 | 0.43 | 1597 |
| 3.75 | 0.4 | 24.7 | 0.02 | 3.0 | 15.4 | 0.03 | 0.43 | 1437 |

Data taken with respect to Table I was based upon a relatively low current input of approximately 0.02 amps and a constant electrolyte temperature of approximately 24.7 degrees C. Table II set forth herebelow represents a continuation of the experimental rein of Table I wherein current was increased to 0.10 amps and heat was added to increase the operating temperature of the liquid electrolyte.

TABLE II

| | | | External Heat Added | | | | | |
|---|---|---|---|---|---|---|---|---|
| Time (hrs) | ΔT °C. (ToTin) | T (in) °C. | Amps | Volts | Flow Rate m/L | Watt in | Watt out | % Yield |
| 3.75 | 0.8 | 25.0 | 0.10 | 3.95 | 15.4 | 0.25 | 0.86 | 345 |
| 4.75 | 1.2 | 27.2 | 0.10 | 3.80 | 15.4 | 0.23 | 1.29 | 562 |
| 6.00 | 1.6 | 29.0 | 0.10 | 3.80 | 15.4 | 0.23 | 1.73 | 750 |
| 7.25 | 2.6 | 32.5 | 0.10 | 3.60 | 15.4 | 0.21 | 2.80 | 1335 |
| 7.80 | 2.8 | 37.0 | 0.10 | 3.50 | 15.4 | 0.20 | 3.02 | 1509 |
| 8.60 | 4.5 | 43.0 | 0.10 | 3.40 | 15.4 | 0.19 | 4.85 | 2553 |

% Yield = Watts out/watts in × 100

Referring now to FIG. 8, the calculated data of yield in terms of wattage out divided by wattage in from Tables I and II is presented with respect to the electrolyte steady state temperature. Note that the data with respect to Table I at 0.02 amps was taken at a relatively steady state electrolyte temperature of about 24.7 degrees, the yield apparently increasing as a result of cell operating time. The substantially higher yields of Table I appear to be directly attributable to the increased steady state temperature of the electrolyte.

CELL RESISTANCE

In preparing the electrolytic cells for testing, the cell resistance utilizing a Wheatstone Bridge was utilized prior to the introduction of the electrolyte into the electrolytic cell. This cell resistance, when dry, should be infinitely high. Otherwise, a short between the anode screen and the cathode beads exists and the unit would have to be repacked. Prior to testing, with electrolyte present, the cell resistance was set at 16 ohms by appropriate compression of the end members.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A system for electrolysis and heating of a liquid electrolyte within an electrolytic cell comprising:

said electrolytic cell including a non-conductive housing and an inlet and an outlet;

a first conductive foraminous grid positioned within said housing adjacent to said inlet;

a second conductive foraminous grid positioned within said housing spaced from said first conductive grid and adjacent to said outlet;

a plurality of conductive beads each having a conductive metallic surface which will combine with hydrogen or an isotope of hydrogen to form a metallic hydride, said conductive beads in electrical communication with said first conductive grid end electrically isolated from said second grid:

means for pumping said liquid electrolyte into said electrolytic cell through said inlet, said electrolyte having a conductive salt in solution with water;

means for heating said liquid electrolyte external to said electrolytic cell as said liquid electrolyte flows through said system;

an electric power source operably connected to said first and second grids wherein each said conductive bead includes:
  a conductive metal flash coating of uniform thickness formed by chemical combination with a cation exchange surface of a spherical cross-linked polymer microbead from a metal cation which has been chemically reduced with hydrazine;
  a nickel layer of uniform thickness formed atop said flash coating;
  a metallic hydride forming layer of uniform thickness formed atop said nickel layer;
  a metallic support layer of uniform thickness formed atop said metallic hydride forming layer.

2. A system as set forth in claim 1, wherein:

said conductive salt comprises an element from the group consisting of lithium, boron, aluminum, gallium and thallium.

3. A system as set forth in claim 1, wherein said electrolytic cell further comprises:

a foraminous non-conductive mesh positioned within said housing adjacent to and spaced from said second grid;

said electrolytic cell being in an upright position and said conductive beads are loosely packed within said electrolytic cell;

said conductive beads being elevated and mixed above said first grid by said electrolyte, said non-conductive mesh preventing said conductive beads from contacting said second grid.

4. A system as set forth in claim 1, wherein:

each said conductive bead is sized in the range of about 1 mm or less in diameter.

5. A system as set forth in claim 1, wherein:

said liquid electrolyte includes a heavy water.

6. A system as set forth in claim 5, wherein:

said heavy water is deuterium oxide ($D_2O$).

7. A system as set forth in claim 1, wherein:

said metallic hydride forming layer is taken from the group consisting of:

palladium, lanthanum, praseodymium, cerium, titanium, zirconium, vanadium, tantalum, uranium, hafnium and thorium.

8. A system as set forth in claim 1, wherein each said conductive bead further includes:

a metallic stabilizer layer of uniform thickness formed atop said support layer.

9. A system as set forth in claim 1, wherein:

said flash coating has a thickness in the range of 1 to 10 angstroms;

said nickel layer and said support layer each have a thickness in the range of about 10 angstroms to 1 micron;

said metallic hydride forming layer has a thickness in the range of about 10 angstroms to 2 microns;

said metallic stabilizer layer has a thickness in the range of about 1 to 60 angstroms.

10. A system as set forth in claim 1, wherein:

said flash coating is taken from the group consisting of: copper, palladium, nickel and titanium;

said metallic hydride forming layer is taken from the group consisting of:
palladium, lanthanum, praseodymium, cerium, titanium, zirconium, vanadium, tantalum, uranium, hafnium and thorium;

said support layer is taken from the group consisting of: nickel, gold, silver and titanium; and said metallic stabilizer layer is taken from the group consisting of:
chromium, iron, cobalt and nickel.

11. A system as set forth in claim 1, further comprising:

a plurality of non-metallic beads each having a sulfonated surface which has been ion exchanged with a lithium salt;

said plurality of non-metallic beads positioned between said second grid and said conductive beads;

said plurality of non-metallic beads forming a conductive salt bridge thereacross.

12. A system for producing useful excess heating of a liquid electrolyte which is heated while flowing through an electrolytic cell, said system comprising:

said electrolytic cell including a non-conductive housing an inlet and an outlet;

a first conductive foraminous grid positioned within said housing adjacent to said inlet;

a second conductive foraminous grid positioned within said housing spaced from said first conductive grid and adjacent to said outlet;

a plurality of conductive beads each having a conductive metallic surface which will combine with hydrogen or an isotope of hydrogen to form a metallic hydride, said conductive beads in electrical communication with said first conductive grid and electrically isolated from said second grid;

means for pumping said liquid electrolyte into said electrolytic cell through said inlet, said electrolyte having a conductive salt in solution with water;

means for heating said liquid electrolyte external to said electrolytic cell as said liquid electrolyte flows through said system;

an electric power source operably connected to said first and second grids wherein each said conductive bead includes:

a conductive metal flash coating of uniform thickness formed by chemical combination with a cation exchange surface of a spherical cross-linked polymer microbead from a metal cation which has been chemically reduced with hydrazine;

a nickel layer of uniform thickness formed atop said flash coating;

a metallic hydride forming layer of uniform thickness formed atop said nickel layer;

a metallic support layer of uniform thickness formed atop said metallic hydride forming layer.

13. A system as set forth in claim 12, wherein:

said conductive salt comprises an element from the group consisting of lithium, boron, aluminum, gallium and thallium.

14. A system as set forth in claim 12, wherein said electrolytic cell further comprises: p1 a foraminous non-conductive mesh positioned within said housing adjacent to and spaced from said second grid;

said electrolytic cell being in an upright position and said conductive beads are loosely packed within said electrolytic cell;

said conductive beads being elevated and mixed above said first grid by said electrolyte, said non-conductive mesh preventing said conductive beads from contacting said second grid.

15. A system as set forth in claim 12, wherein:

each said conductive bead is sized in the range of about 1 mm or less in diameter.

16. A system as set forth in claim 12, wherein:

said liquid electrolyte includes a heavy water.

17. A system as set forth in claim 12, wherein:

said liquid deuterium oxide ($D_2O$).

18. A system as set forth in claim 12, wherein:

said metallic hydride forming layer is taken from the group consisting of:
palladium, lanthanum, praseodymium, cerium, titanium, zirconium, vanadium, tantalum, uranium, hafnium and thorium.

19. A system as set forth in claim 12, wherein each said conductive bead further includes:

a metallic stabilizer layer of uniform thickness formed atop said support layer.

20. A system as set forth in claim 12, wherein:

said flash coating has a thickness in the range of 1 to 10 angstroms;

said nickel layer and said support layer each have a thickness in the range of about 10 angstroms to 1 micron;

said metallic hydride forming layer has a thickness in the range of about 10 angstroms to 2 microns;

said metallic stabilizer layer has a thickness in the range of about 1 to 60 angstroms.

21. A system as set forth in claim 12, wherein:

said flash coating is taken from the group consisting of: copper, palladium, nickel and titanium;

said metallic hydride forming layer is taken from the group consisting of:
palladium, lanthanum, praseodymium, cerium, titanium, zirconium, vanadium, tantalum, uranium, hafnium and thorium;

said support layer is taken from the group consisting of: nickel, gold, silver and titanium; and said metallic stabilizer layer is taken from the group consisting of:
chromium, iron, cobalt and nickel.

22. A system as set forth in claim 12, further comprising:
a plurality of non-metallic beads each having a sulfonated surface which has been ion exchanged with a lithium salt;

said plurality of non-metallic beads positioned between said second grid and said conductive beads;

said plurality of non-metallic beads forming a conductive salt bridge thereacross.

* * * * *